(12) United States Patent
Madnani et al.

(10) Patent No.: US 7,843,866 B1
(45) Date of Patent: Nov. 30, 2010

(54) SYSTEM AND METHOD FOR MIRRORING DATA

(75) Inventors: Kiran Madnani, Framingham, MA (US); Randall H. Shain, Wrentham, MA (US); Roy E. Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 208 days.

(21) Appl. No.: 11/967,856

(22) Filed: Dec. 31, 2007

(51) Int. Cl.
*G06F 12/00* (2006.01)
*H04L 12/56* (2006.01)

(52) U.S. Cl. .................. 370/312; 370/390; 707/999.01; 711/114; 711/162

(58) Field of Classification Search ............... 370/312, 370/390, 432; 707/204, 999.01; 711/114, 711/162
See application file for complete search history.

(56) References Cited

U.S. PATENT DOCUMENTS

| | | | | |
|---|---|---|---|---|
| 6,665,780 B1 * | 12/2003 | Bradley | ....................... | 711/162 |
| 6,834,326 B1 * | 12/2004 | Wang et al. | ................. | 711/114 |
| 7,529,781 B2 * | 5/2009 | Frey et al. | .................... | 707/204 |
| 7,590,114 B1 * | 9/2009 | Bishara | ...................... | 370/390 |
| 7,673,112 B2 * | 3/2010 | Takeuchi et al. | ............ | 711/170 |
| 2005/0254444 A1 * | 11/2005 | Meier et al. | ................. | 370/312 |
| 2005/0256972 A1 * | 11/2005 | Cochran et al. | ............. | 709/245 |
| 2006/0291467 A1 * | 12/2006 | Henry et al. | ................. | 370/390 |
| 2009/0094252 A1 * | 4/2009 | Wong et al. | ................... | 707/10 |
| 2009/0177840 A1 * | 7/2009 | Dale et al. | .................. | 711/118 |

\* cited by examiner

*Primary Examiner*—Chi H Pham
*Assistant Examiner*—Ahmed Elallam
(74) *Attorney, Agent, or Firm*—Holland & Knight LLP; Brian J. Colandreo, Esq.; Mark H. Whittenberger, Esq.

(57) ABSTRACT

A method and computer program product for defining a multicast group within a local area network. The multicast group includes a storage initiator device and a plurality of storage targets. A write request for storing a data segment within the multicast group is received on the storage initiator device. The data segment is multicast to the plurality of storage targets included within the multicast group. The data segment is stored on each of the plurality of storage targets.

10 Claims, 3 Drawing Sheets

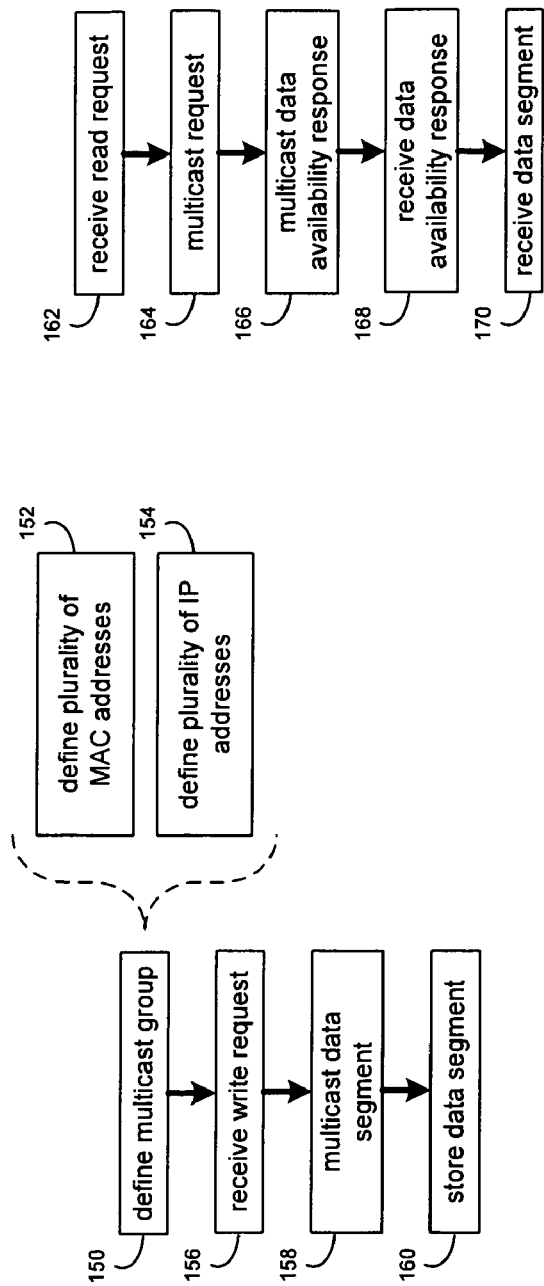

SYSTEM AND METHOD FOR MIRRORING DATA

TECHNICAL FIELD

This disclosure relates to storage networks and, more particularly, to multicast storage networks.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a multicast data mirroring method includes defining a multicast group within a local area network. The multicast group includes a storage initiator device and a plurality of storage targets. A write request for storing a data segment within the multicast group is received on the storage initiator device. The data segment is multicast to the plurality of storage targets included within the multicast group. The data segment is stored on each of the plurality of storage targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computing device including one or more hard drives; and a Storage Area Network.

In another implementation, a computer program product resides on a computer readable medium that has a plurality of instructions stored on it. When executed by a processor, the instructions cause the processor to perform operations including defining a multicast group within a local area network. The multicast group includes a storage initiator device and a plurality of storage targets. A write request for storing a data segment within the multicast group is received on the storage initiator device. The data segment is multicast to the plurality of storage targets included within the multicast group. The data segment is stored on each of the plurality of storage targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computing device including one or more hard drives; and a Storage Area Network.

A multicast data mirroring method includes defining a multicast group within a local area network. The multicast group includes a storage initiator device and a plurality of storage targets. A read request for reading a data segment from the multicast group is received on the storage initiator device. The read request is multicast to the plurality of storage targets included within the multicast group. The data segment is received on the storage initiator device from one or more of the storage targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computing device including one or more hard drives; and a Storage Area Network.

A data availability response may be received, via a multicast, from one or more of the storage targets. The data availability response may define the relative availability of the data segment with respect to the storage target that multicast the data availability response. The data segment received on the storage initiator device may be multicast from the one or more of the storage targets.

In another implementation, a computer program product resides on a computer readable medium that has a plurality of instructions stored on it. When executed by a processor, the instructions cause the processor to perform operations including defining a multicast group within a local area network. The multicast group includes a storage initiator device and a plurality of storage targets. A read request for reading a data segment from the multicast group is received on the storage initiator device. The read request is multicast to the plurality of storage targets included within the multicast group. The data segment is received on the storage initiator device from one or more of the storage targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computing device including one or more hard drives; and a Storage Area Network.

A data availability response may be received, via a multicast, from one or more of the storage targets. The data availability response may define the relative availability of the data segment with respect to the storage target that multicast the data availability response. The data segment received on the storage initiator device may be multicast from the one or more of the storage targets.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a flowchart of a data write process executed by the data mirroring process of FIG. 1; and FIG. 4 is a flowchart of a data read process executed by the data mirroring process of FIG. 1.

Like reference symbols in the various drawings indicate like elements.

DETAILED DESCRIPTION OF THE PREFERRED EMBODIMENTS

System Overview

Figure 1:
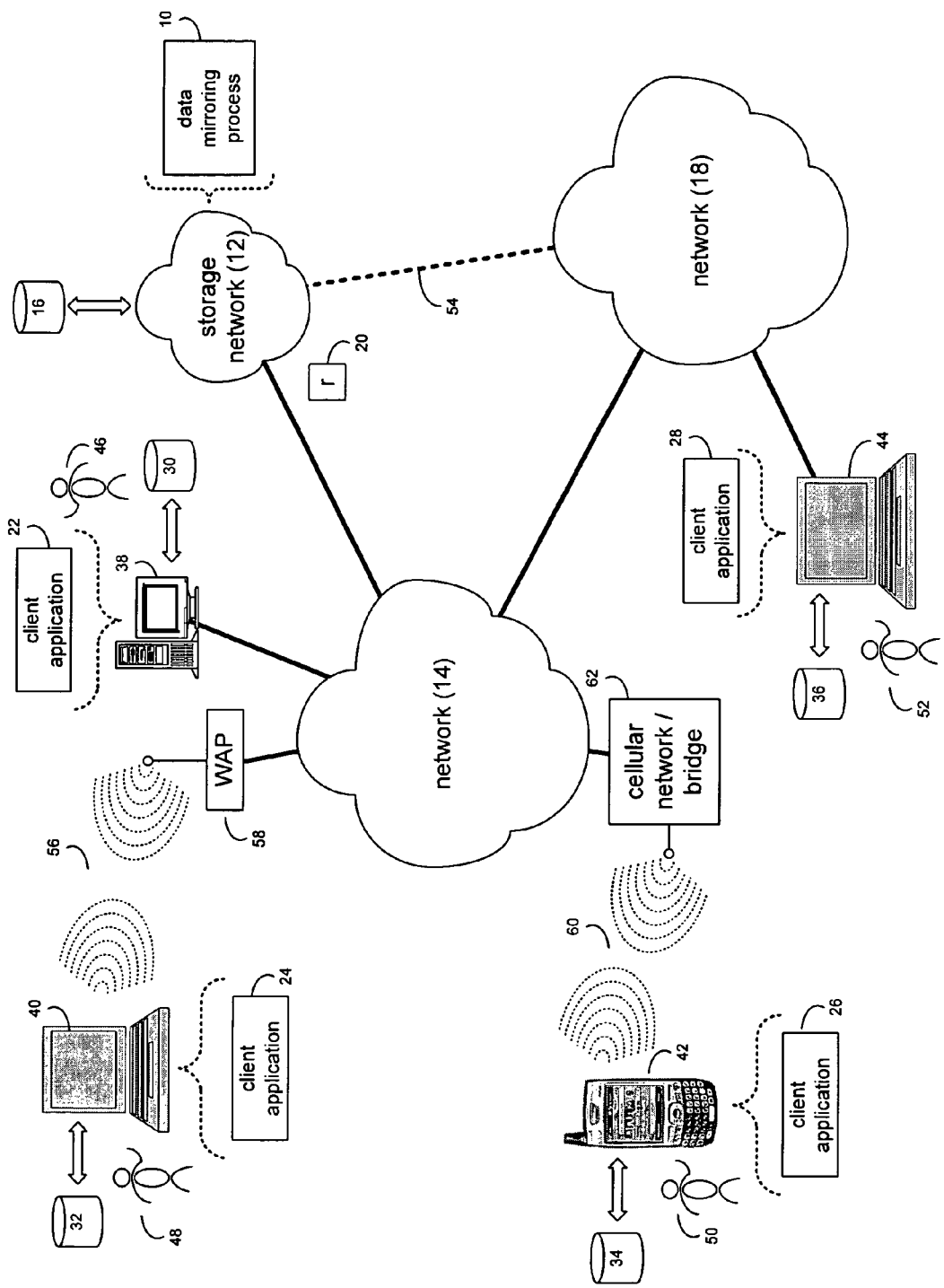
FIG. 1 is a diagrammatic view of a storage array and a data mirroring process coupled to a distributed computing network.

Referring to FIG. 1, there is shown data mirroring process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data mirroring process 10 may define a multicast group within a local area network. The multicast group may include a storage initiator device and a plurality of storage targets.

A write request for storing a data segment within the multicast group may be received on the storage initiator device. The data segment may be multicast to the plurality of storage targets included within the multicast group. The data segment may be stored on each of the plurality of storage targets.

A read request for reading a data segment from the multicast group may be received on the storage initiator device. The read request may be multicast to the plurality of storage targets included within the multicast group. The data segment may be received on the storage initiator device from one or more of the storage targets The instruction sets and subroutines of data mirroring process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Mirroring Process:

For the following discussion, client application 22 is going to be described for illustrative purposes. However, this is not intended to be a limitation of this disclosure, as other client applications (e.g., client applications 24, 26, 28) may be equally utilized.

Figure 2:
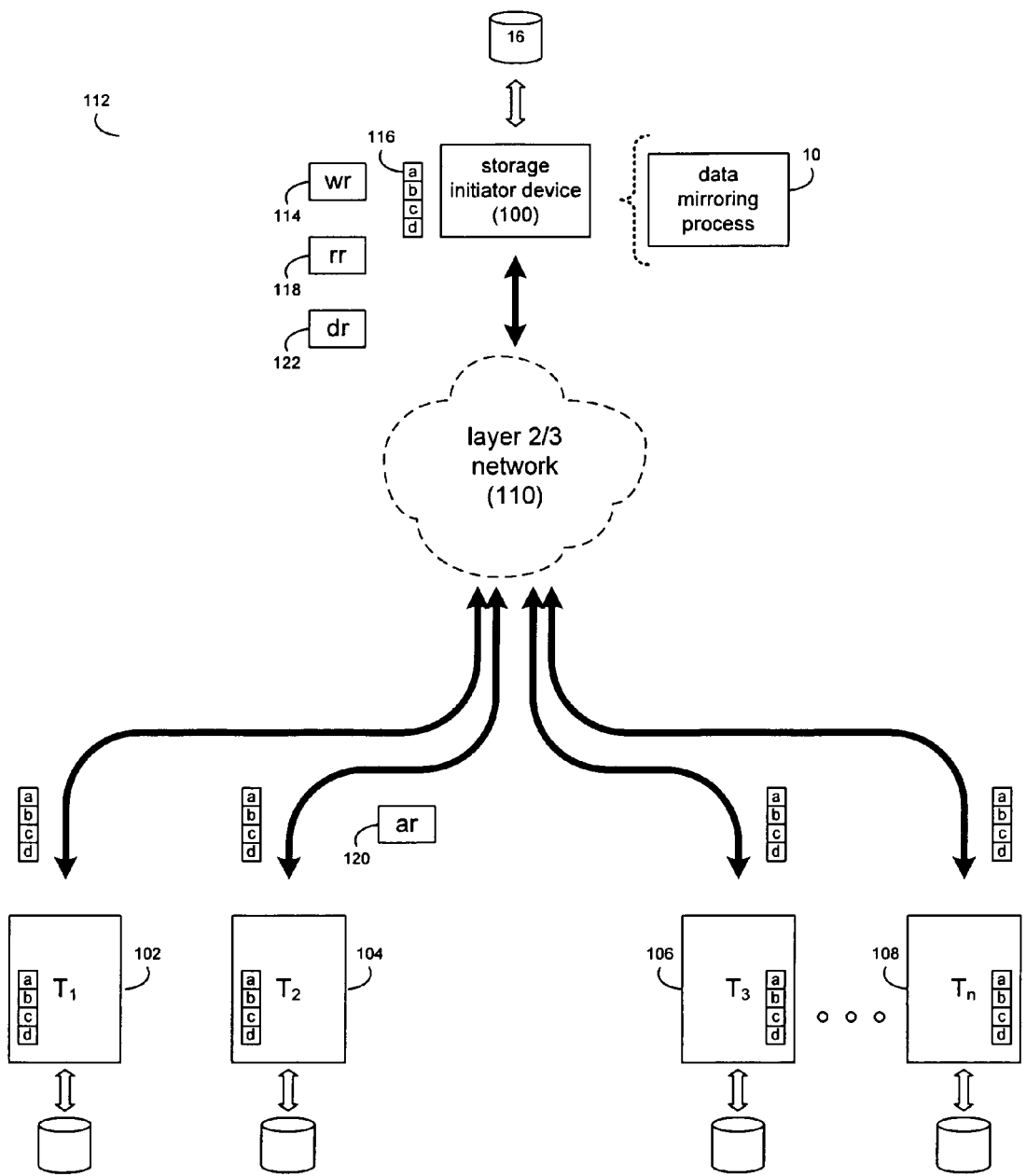
FIG. 2 is a diagrammatic view of the storage array of FIG. 1.

Referring also to FIG. 2, storage network 12 may include a storage initiator device (e.g. storage initiator device 100) and a plurality of storage targets $T_{1-n}$ (e.g. storage targets 102, 104, 106, 108). While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy required.

The manner in which storage network 12 is implemented may vary depending upon e.g. the level of redundancy required. For example, storage network 12 may be a RAID array in which storage initiator device 100 is a RAID controller card and storage targets 102, 104, 106, 108 are individual "hot-swappable" hard disk drives. An example of such a RAID array may include but is not limited to an NAS device. Alternatively, storage network 12 may be configured as a SAN, in which storage initiator device 100 may be e.g., a server computer and each of storage targets 102, 104, 106, 108 may be a RAID array and/or computer-based hard disk drive. Further still, one or more of storage targets 102, 104, 106, 108 may be a SAN.

In the event that storage network 12 is configured as a SAN, the various components of storage network 12 (e.g. storage initiator device 100 and storage targets 102, 104, 106, 108) may be coupled using network infrastructure 110, examples of which may include but are not limited to a Layer 2 network and a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. storage initiator device 100 and storage targets 102, 104, 106, 108) may be addressed using MAC (i.e., Media Access Control) addresses. When network infrastructure 110 is a Layer 2 network infrastructure, each of storage initiator device 100 and storage targets 102, 104, 106, 108 may have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. storage initiator device 100 and storage targets 102, 104, 106, 108) may be addressed using IP (i.e., Internet Protocol) addresses. When network infrastructure 110 is a Layer 3 network infrastructure, each of storage initiator device 100 and storage targets 102, 104, 106, 108 may have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Storage initiator device 100 may execute all or a portion of data mirroring process 10. Additionally, one or more of storage targets 102, 104, 106, 108 may execute all or a portion of data mirroring process 10. For example, data mirroring process 10 may be a multi-component process that includes e.g., an initiator-based component (not shown) and a target-based component (not shown). For example and for illustrative purposes, the initiator-based component of data mirroring process 10 may be executed on storage initiator device 100. Further and for illustrative purposes, the target-based component of data mirroring process 10 may be executed on each of storage targets 102, 104, 106, 108. Accordingly, the initiator-based component of data mirroring process 10 and the target-based component(s) of data mirroring process 10 may cooperatively operate to effectuate all of the functionality of data mirroring process 10.

The instruction sets and subroutines of the initiator-based component of data mirroring process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID array; a random access memory (RAM); and a read-only memory (ROM).

The instruction sets and subroutines of the target-based component of data mirroring process 10, which may be stored on a storage device (not shown) coupled to e.g., each of storage targets 102, 104, 106, 108, may be executed by one or more processors (not shown) and one or more memory architectures (not shown) included within each of storage targets 102, 104, 106, 108. The storage device (not shown) may include but is not limited to: a hard disk drive; a tape drive; an optical drive; a RAID array; a random access memory (RAM); and a read-only memory (ROM).

Referring also to FIG. 3, data mirroring process 10 may utilize multicasting to distribute data requests between various devices (e.g. storage initiator device 100 and storage targets 102, 104, 106, 108) included within storage network 12. Accordingly, data mirroring process 10 may define 150 a multicast group (e.g. multicast group 112) within network infrastructure 110, such that a message multicast by any device within storage network 12 may be received by any other device within storage network 12. When defining multicast group 112, the manner in which the multicast group is defined may vary depending on the type of network infrastructure (e.g. Layer 2 or Layer 3). For example, when data mirroring process 10 is defining 150 a multicast group within a Layer 2 network infrastructure, data mirroring process 10 may define 152 multicast group 112 as a plurality of MAC addresses to be addressable as a whole by a single multicast MAC address. Alternatively, when data mirroring process 10 is defining 150 a multicast group within a Layer 3 infrastructure, data mirroring process 10 may define 154 multicast group 112 as a plurality of IP addresses to be addressable as a whole by a single multicast IP address.

As discussed above, various data requests (e.g. data request 20) may be sent from client applications 22, 24, 26, 28 to storage network 12, and examples of data request 20 may include but are not limited to data write requests (i.e. a request that a data segment be written to storage network 12) and data read requests (i.e. a request that a data segment be read from storage network 12).

Upon storage initiator device 100 receiving 156 a write request (e.g. write request 114) for storing a data segment (e.g. data segment 116) within multicast group 112, data mirroring process 10 may multicast 158 data segment 116 to the storage targets (e.g. storage targets 102, 104, 106, 108) included within multicast group 112. When multicasting 158 data segment 116 to each of storage targets 102, 104, 106, 108, data mirroring process 10 may provide data segment 116 in its entirety to the storage targets. For illustrative purposes, assume that data segment 116 is an 8 kilobyte data segment that includes four 2 kilobyte data chunks, namely data chunk "a", data chunk "b", data chunk "c", and data chunk "d". Accordingly, when multicasting 158 data segment 116 to each of storage targets 102, 104, 106, 108, data mirroring process 10 may multicast 158 the entire 8 kilobyte data segment (including data chunk "a", data chunk "b", data chunk "c", and data chunk "d").

Upon receiving data segment 116, which was multicast 158 by storage initiator device 100, data mirroring process 10 may store 160 data segment 116 on each of the plurality of storage targets (e.g. storage targets 102, 104, 106, 108). Accordingly, on each of storage targets 102, 104, 106, 108, an identical copy of data segment 116 may be stored 160, thus providing an increased level of data redundancy.

Upon receiving and/or storing 160 data segment 116, the storage target receiving and/or storing 160 data segment 116 may transmit a positive acknowledgment to multicast group 112 (i.e. a message that announces that the subject storage target did receive and/or store 160 data segment 116).

Conversely, in the event that the storage target fails to receive and/or store 160 data segment 116, the storage target in question may transmit a negative acknowledgment to multicast group 112 (i.e. a message that announces that the subject storage target did not receive and/or store 160 data segment 116). In the event that a negative acknowledgment is transmit to multicast group 112, one or more of the storage targets that did indeed successfully receive and/or store 160 data segment 116 may either multicast data segment 116 to multicast group 112 or may unicast data segment 116 to the specific storage target that transmit the negative acknowledgment (i.e., the storage target that did not receive the multicast data segment).

Referring also to FIG. 4, upon storage initiator device 100 receiving 162 a read request (e.g. read request 118) for reading a data segment (e.g. data segment 116) from multicast group 112, data mirroring process 10 may multicast 164 read request 118 to the storage targets (e.g. storage targets 102, 104, 106, 108) included within multicast group 112.

Upon receiving read request 118, each of storage targets 102, 104, 106, 108 may generate data availability response 120, which may be multicast 166 to all devices included within multicast group 112. Once multicast 166 by a storage target (e.g. storage targets 102, 104, 106, 108), data availability response 120 may be received 166 by storage initiator device 100.

Data availability response 120 may define the relative availability of data segment 116 with respect to the storage target that multicast data availability response 120. For example, storage target 102 may generate a data availability response that defines data segment 116 as being in the cache memory (not shown) of storage target 102. As another example, storage target 104 may generate a data availability response that defines storage target 104 as being too busy to respond to read request 118. As a further example, storage target 106 may generate a data availability response that defines data segment 116 as being positioned proximate one of the read heads of storage target 104.

Upon receiving 168 such data availability responses, data mirroring process 10 may utilize such responses to decide which storage target is best suited to provide data segment 116. One such a decision has been made, data mirroring process 10 may multicast or unicast data request 122 for data segment 116 from the selected storage target. The selected storage target may then multicast or unicast data segment 116 to storage initiator device 100.

Additionally/alternatively, upon receiving 168 such data availability multicast responses from peer storage targets, each of storage targets 102, 104, 106, 108 may agree implicitly which storage target has the data segment (e.g., data segment 116) availability most favorable to storage initiator device 100 and allow that storage target to solely respond with data segment 116.

Additionally/alternatively, upon receiving read request 118, each of storage targets 102, 104, 106, 108 may simply multicast or unicast data segment 116 to storage initiator device 100.

In order to strike a balance between the utilization of network infrastructure 110 for transmitting data (e.g. data segment 116) and the utilization of network infrastructure 110 for transmitting messages (e.g. data availability response 120 and data request 122), data mirroring process 10 may have the storage targets generate a data availability response when the requested data segment is larger than a defined size (e.g. larger than a jumbo frame i.e. 8 kB), thus preventing the simultaneous transmit of multiple copies of data segment 116. Accordingly, for read requests that are requesting a data segment that is smaller than a defined size, all available storage targets may immediately multicast or unicast the requested data segment without first generating a data availability response.

Once data segment 116 is received 170 on storage initiator device 100, data mirroring process 10 may transmit data segment 116 to the client electronic device (e.g., personal computer 38, laptop computer 40, personal digital assistant 42, and notebook computer 44) that requested data segment 116.

A number of implementations have been described. Nevertheless, it will be understood that various modifications may be made. Accordingly, other implementations are within the scope of the following claims.

What is claimed is:

1. A multicast data mirroring method comprising:
defining a multicast group within a local area network, wherein the multicast group includes a storage initiator device and a plurality of storage targets;
receiving, on the storage initiator device, a read request for reading a data segment from the multicast group;
multicasting the read request to the plurality of storage targets included within the multicast group;
receiving, via a multicast, a data availability response from one or more of the storage targets, wherein the data availability response defines the relative availability of the data segment with respect to the storage target that multicast the data availability response;
determining a best suited storage target based upon, at least in part, the data availability response; and
receiving, on the storage initiator device, the data segment from one or more of the storage targets.

2. The multicast data mirroring method of claim 1 wherein defining the multicast group includes defining a group of IP addresses to be addressable as a whole by a single multicast IP address.

3. The multicast data mirroring method of claim 1 wherein defining the multicast group includes defining a group of MAC addresses to be addressable as a whole by a single multicast MAC address.

4. The multicast data mirroring method of claim 1 wherein at least one of the plurality of storage targets is chosen from the group consisting of: a hard drive; a RAID array of hard drives; a computing device including one or more hard drives; and a Storage Area Network.

5. The multicast data mirroring method of claim 1 wherein the data segment received on the storage initiator device is multicast from the one or more of the storage targets.

6. A computer program product residing on a non-transitory computer readable medium having a plurality of instructions stored thereon which, when executed by a processor, cause the processor to perform operations comprising:
defining a multicast group within a local area network, wherein the multicast group includes a storage initiator device and a plurality of storage targets;
receiving, on the storage initiator device, a read request for reading a data segment from the multicast group;
multicasting the read request to the plurality of storage targets included within the multicast group;

receiving, via a multicast, a data availability response from one or more of the storage targets, wherein the data availability response defines the relative availability of the data segment with respect to the storage target that multicast the data availability response;

determining a best suited storage target based upon, at least in part, the data availability response; and receiving, on the storage initiator device, the data segment from one or more of the storage targets.

7. The computer program product of claim 6 wherein the instructions for defining the multicast group include instructions for defining a group of IP addresses to be addressable as a whole by a single multicast IP address.

8. The computer program product of claim 6 wherein the instructions for defining the multicast group include instructions for defining a group of MAC addresses to be addressable as a whole by a single multicast MAC address.

9. The computer program product of claim 6 wherein at least one of the plurality of storage targets is chosen from the group consisting of: a hard drive; a RAID array of hard drives; a computing device including one or more hard drives; and a Storage Area Network.

10. The computer program product of claim 6 wherein the data segment received on the storage initiator device is multicast from the one or more of the storage targets.

* * * * *